(12) United States Patent
Leblon

(10) Patent No.: US 10,794,315 B2
(45) Date of Patent: Oct. 6, 2020

(54) METHOD FOR DIAGNOSING THE OPERATION OF A MOTOR VEHICLE DIESEL ENGINE INJECTOR

(71) Applicants: Continental Automotive France, Toulouse (FR); Continental Automotive GmbH, Hannover (DE)

(72) Inventor: Michael Leblon, Bressols (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 10 days.

(21) Appl. No.: 16/095,089

(22) PCT Filed: Apr. 10, 2017

(86) PCT No.: PCT/FR2017/050857
§ 371 (c)(1),
(2) Date: Oct. 19, 2018

(87) PCT Pub. No.: WO2017/187042
PCT Pub. Date: Nov. 2, 2017

(65) Prior Publication Data
US 2019/0128204 A1 May 2, 2019

(30) Foreign Application Priority Data
Apr. 27, 2016 (FR) .................................... 16 53713

(51) Int. Cl.
*F02D 41/22* (2006.01)
*F02D 41/24* (2006.01)
(Continued)

(52) U.S. Cl.
CPC ....... *F02D 41/221* (2013.01); *F02D 41/2467* (2013.01); *F02D 41/3827* (2013.01);
(Continued)

(58) Field of Classification Search
CPC .............. F02D 41/221; F02D 41/3827; F02D 41/2467; F02D 2041/224; F02B 77/083; Y02T 10/40
See application file for complete search history.

(56) References Cited

U.S. PATENT DOCUMENTS

2003/0200957 A1 10/2003 Shinogle
2006/0191256 A1 8/2006 Colignon
(Continued)

FOREIGN PATENT DOCUMENTS

CN 103105846 A 5/2013
EP 1205883 A1 5/2002
(Continued)

OTHER PUBLICATIONS

International Search Report and Written Opinion for International Application No. PCT/FR2017/050857, dated Jul. 14, 2017—10 pages.

*Primary Examiner* — Xiao En Mo
(74) *Attorney, Agent, or Firm* — RatnerPrestia

(57) ABSTRACT

A method for diagnosing the operation of an injector of a diesel engine of a vehicle, controlled by a plurality of control laws on the basis of at least one operating parameter of the injector for each control law. The method includes a step of measuring an operating parameter value during use of the injector, a step of determining an efficiency value of each control law on the basis of the measured value of the parameter and of a predetermined reference curve representing the efficiency of the parameter in its interval of operating values, and a step of determining an efficiency value of the injector on the basis of the efficiency value of each of the control laws.

12 Claims, 2 Drawing Sheets

(51) Int. Cl.
*F02D 41/38* (2006.01)
*F02B 77/08* (2006.01)

(52) U.S. Cl.
CPC ...... *F02B 77/083* (2013.01); *F02D 2041/224* (2013.01); *Y02T 10/40* (2013.01)

(56) References Cited

U.S. PATENT DOCUMENTS

| | | |
|---|---|---|
| 2010/0199752 A1 | 8/2010 | Lucido et al. |
| 2011/0313639 A1* | 12/2011 | Hemmerlein ...... F02M 63/0225 701/103 |
| 2013/0124032 A1 | 5/2013 | Singh et al. |
| 2013/0275026 A1 | 10/2013 | Methil-Suhakaram et al. |
| 2014/0283792 A1 | 9/2014 | Benson |
| 2015/0096539 A1 | 4/2015 | Leblon et al. |
| 2016/0063453 A1 | 3/2016 | Guenther et al. |
| 2016/0085864 A1 | 3/2016 | Morimoto et al. |
| 2016/0133070 A1 | 5/2016 | Ikeda |

FOREIGN PATENT DOCUMENTS

| | | |
|---|---|---|
| EP | 2731085 A1 | 5/2014 |
| EP | 2782072 A2 | 9/2014 |
| FR | 2862086 A1 | 5/2005 |
| FR | 3007135 A1 | 12/2014 |
| JP | 2015132947 A1 | 3/2017 |
| WO | 2007115140 A2 | 10/2007 |
| WO | 2014174791 A1 | 10/2014 |
| WO | 2014177309 A1 | 11/2014 |

\* cited by examiner

METHOD FOR DIAGNOSING THE OPERATION OF A MOTOR VEHICLE DIESEL ENGINE INJECTOR

CROSS REFERENCE TO RELATED APPLICATIONS

This application is the U.S. National Phase Application of PCT International Application No. PCT/FR2017/050857, filed Apr. 10, 2017, which claims priority to French Patent Application No. 1653713, filed Apr. 27, 2016, the contents of such applications being incorporated by reference herein.

FIELD OF THE INVENTION

The present invention pertains to the field of motor vehicles and relates more particularly to a method for diagnosing the operation of the injectors of a motor vehicle diesel engine.

BACKGROUND OF THE INVENTION

The engine of a motor vehicle conventionally includes cylinders each defining a combustion chamber into which fuel and combustion agent are introduced via injectors in order to combust the mixture. During combustion, an electronic control unit of the vehicle determines an amount of fuel to be injected in order to guarantee optimum operation of the engine, and then the injector is actuated so as to inject said determined amount of fuel.

In practice, during use of the vehicle, the amount of fuel actually injected may differ from the amount of fuel to be injected under the effect of physical phenomena such as wear to the injector, propagation of waves in the fuel before injection, etc.

Thus, methods for the self-adjustment of the controlling of the injector are known, these making it possible to detect, during an injection, a difference between the amount of fuel to be injected and the amount actually injected by measuring various parameters of the injector, such as the electric supply voltage to a piezoelectric injector, the injection time, etc. Such a difference is then compensated in subsequent injection control operations.

Document US2013/275026 A1, which is incorporated by reference, is known for example and describes a diagnostic method based on reviewing the pressure signal from the high-pressure rail or common rail. The measured signal interference indicates a problem with the component. The invention relates to the identification of a faulty component of the supply system by processing rail pressure data. This document involves evaluating the amplitude of a fault, that is to say that the system is already faulty. The problem that is presented is that of detecting defective components. The invention according to this document proposes a method for diagnosing an anomaly.

Document US2011/313639 A1, which is incorporated by reference, is also known and describes a method for testing an injector based on reviewing the pressure signal from the high-pressure rail or common rail. A pressure measurement before/after injection is performed and correlated with the theoretical injected amount in order to evaluate a first performance factor of the injector. The document discloses performance tests on a fuel injector in order to identify a non-compliant injector. The performance of an injector is determined for the purpose of modifying the amount of fuel to be injected or to indicate a defective injector.

Document US2011/313639 A1 is also known and describes a method for diagnosing the operating state of an injector based on reviewing the pressure signal from the high-pressure rail or common rail. The aim of the method is to detect possible malfunctioning of an injector. Like the previous document, a pressure measurement before/after injection is performed and then correlated cylinder to cylinder.

Such self-adjustment methods thus make it possible to ensure optimum operation of the engine. However, they do not make it possible to diagnose the state of an injector during an after-sales servicing operation on the vehicle, for example with a mechanic.

Specifically, a mechanic does not always have access to the measurements of the injection parameters, or else not to all of these measurements. Thus, the mechanic is not able to use these measurements to diagnose the state of an injector and thus determine whether it is necessary to change it, or even if it is still able to be used. In addition, these parameters may be measured at different operating points of the injector, in other words at various pressures of the fuel in the supply rail and various fuel injection rates. Thus, a value of a parameter on its own does not make it possible to determine whether it corresponds to correct or to incorrect operation of the injector, but also depends on the operating point at which the measurement was performed, thereby making interpretation on the basis of a value of a parameter difficult.

In addition, when a trained mechanic accesses these measurements, it is difficult for him to interpret the values because the measured injection parameters and the operating points at which the measurements are performed may vary depending on the motor vehicle manufacturer.

These difficulties in diagnosing the injector result in changes of the injector when said injector is still able to be used, thereby leading to additional costs for the vehicle owner and to the owner's perception of the brand of the motor vehicle being worsened.

SUMMARY OF THE INVENTION

There is therefore a need to easily and efficiently diagnose the operation of an engine injector.

To this end, one aspect of the invention is a method for diagnosing the operation of at least one injector of a diesel engine of a motor vehicle, said injector being controlled by at least one control law on the basis of at least one operating parameter of the injector, the method being noteworthy in that it comprises:
  a step of measuring a value of said operating parameter during use of said injector, and
  a step of determining an efficiency value of the injector on the basis of the measured value of the parameter and of a predetermined reference curve representing the efficiency of the parameter in its interval of operating values,
the injector being controlled by a plurality of control laws on the basis of at least one operating parameter of the injector for each of the control laws,
  a step of determining an efficiency value of each control law on the basis of the measured value of said at least one parameter and of a predetermined reference curve representing the efficiency of said parameter in its interval of operating values, and wherein the efficiency value of the injector is determined on the basis of the efficiency value of each of the control laws.

The control law is designed to control the injector so as to compensate a physical phenomenon, for example the electric control power of the injector, the flow of fuel supplied by the injector, the mechanical and/or hydraulic drift of the injector, play between the opening element of the injector and its actuator, the balancing of the cylinders, etc.

By virtue of the method according to an aspect of the invention, the efficiency value of an injector is able to be determined easily by virtue of the reference curve of the parameter. It is thus possible to diagnose the injector by virtue of the efficiency value of the parameter and not using the value of the parameter, which on its own does not always make it possible to determine the operating state of the injector. By virtue of the reference curve, it is possible to determine the value of the efficiency of the parameter on the basis of the value of the parameter and thus to easily diagnose the injector. Diagnosing the injector then makes it possible to optimize maintenance of the engine, in particular by avoiding replacing an injector whose operation is normal.

Advantageously, the determination of the efficiency value of the injector is calculated on the basis of the average of the efficiency of the various parameters, the average of the efficiency of the parameters being weighted by the most representative parameters in order to diagnose the operation of the injector.

Advantageously, the method comprises a preliminary step of determining the reference curve. Various parameters may thus be used when determining the reference curve of these parameters.

The reference curve is preferably determined empirically. Thus, such a reference curve is easy to determine, in particular in the laboratory.

Preferably, the parameter is chosen from among: the drift in the electric supply voltage to the injector, the flow of fuel supplied by the injector at a predetermined operating point of the injector and the drift of the fuel injection time of the injector. Thus, the method according to the invention may be used for various parameters.

Advantageously, with the injector being controlled by the control law on the basis of a plurality of operating parameters of the injector, the measurement is performed for each of said operating parameters during use of the injector, and the efficiency value of the injector is determined for each parameter on the basis of the measured value of said parameter and of a predetermined reference curve representing the efficiency of said parameter in its interval of operating values.

Preferably, the method comprises a step of limiting the determined efficiency value of the injector if at least one of the parameters has not been measured.

An aspect of the invention also relates to a method for diagnosing the operation of a diesel engine of a motor vehicle, the engine comprising a plurality of injectors, the method comprises, for each injector, a step of implementing the method as described above for diagnosing the operation of an injector, and a step of diagnosing the operation of the engine on the basis of the efficiency of the operation of each of the injectors of the engine so as to determine the operating state of the engine.

Preferably, the method comprises a step of displaying the efficiency value of the operation of the engine, preferably said efficiency value of the operation of the engine is determined on the basis of the efficiency value of the operation of each of the injectors. Thus, the driver of the vehicle or a garage operator is easily able to be informed of the operating state of the engine, thereby making it easy to maintain the vehicle while at the same time avoiding needless replacement of an injector.

An aspect of the invention furthermore targets a motor vehicle comprising a diesel engine comprising at least one injector and an electronic control unit for said engine, said electronic control unit being designed to implement the method for diagnosing the injector as described previously or the method for diagnosing the operation of an engine of a motor vehicle as described previously.

BRIEF DESCRIPTION OF THE DRAWINGS

Other features and advantages of aspects of the invention will emerge during the following description, given with reference to the appended figures, which are given by way of non-limiting example and in which identical references are given to similar objects.

DETAILED DESCRIPTION OF THE PREFERRED EMBODIMENTS

The following text presents the diagnosis of the operation of an engine of a motor vehicle. It will be noted that such an application does not limit the scope of aspects of the present invention, which may be applied to any type of vehicle.

Figure 1:
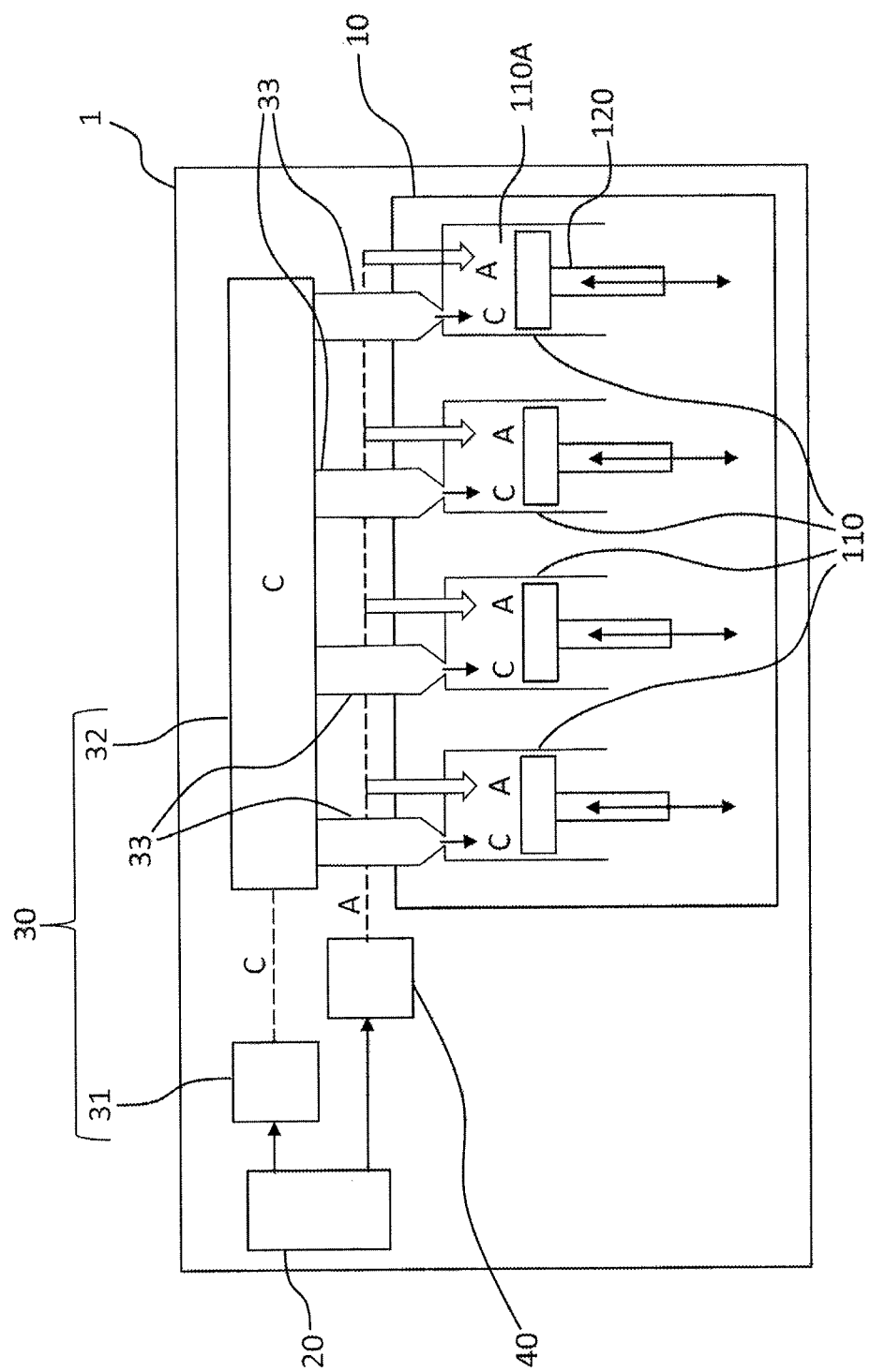
FIG. 1 schematically shows one embodiment of the motor vehicle according to an aspect of the invention.

With reference to FIG. 1, a motor vehicle 1 comprises, a diesel thermal combustion engine 10, an electronic control unit 20 for the thermal combustion engine 10, a fuel C supply system 30 and an air A supply system 40 for the engine 10.

The engine 10 comprises a plurality of cylinders 110 each defining a combustion chamber 110A into which a volume of fuel C and a volume of air A are introduced upon each cycle of the engine 10 so as to combust the mixture thereof. FIG. 1 shows the case in which the engine 10 includes four cylinders 110, but such a case does not limit the scope of an aspect of the invention, which applies to an engine 10 that may comprise more or fewer than four cylinders.

Each cylinder 110 comprises a piston 120 mounted in the combustion chamber 110A. The piston 120 is designed to be driven in translation by the combustion of the mixture in the combustion chamber 110A. The pistons 120 drive the rotation of a main shaft of the engine 10, also denoted 'engine flywheel', thus allowing the engine 10 to transform the energy released by the combustion into mechanical energy.

The fuel supply system 30 comprises a supply pump 31, a fuel C distribution rail 32 supplied by the supply pump 31 and a plurality of injectors 33 supplied with fuel C by the distribution rail 32.

An injector 33 is mounted on each cylinder 110 so as to inject, upon each cycle of the engine 10, an amount of fuel C, determined by the electronic control unit 20, into the corresponding combustion chamber 110A. Such an injector 33 may be of solenoid or piezoelectric type or any other suitable type. The injector 33 comprises an opening element (not shown) that controls the flow of fuel C, and an actuator (not shown) for said opening element. The opening element, which may for example take the form of a needle or of a mushroom mounted at an orifice of the injector 33, allows fuel C to flow in the open position so as to inject fuel C into the combustion chamber 110A, and blocks the flow of fuel C in the closed position. To ensure that fuel C is blocked in the closed position of the opening element, the opening element and the actuator are linked in such a way as to have operational play that ensures leak-free closure of the opening element.

The distribution rail 32, also called common rail, is designed to simultaneously supply several cylinders 110 with fuel C. The fuel C is pressurized in the distribution rail 32, so as to allow efficient supplying of the combustion chamber 110A.

The air supply system 40 makes it possible to inject an amount of air A, determined by the electronic control unit 20, into the combustion chamber 110A of each cylinder 110. To this end, in this example of a diesel motor vehicle, the air supply system 40 comprises a butterfly valve (not shown) that makes it possible to adjust the flow of air A supplying the combustion chamber 110A.

As mentioned above, the fuel supply system 30 and air supply system 40 are controlled by the electronic control unit 20.

More precisely, the electronic control unit 20, commonly called ECU, determines the amounts of fuel C and of air A to be injected into the combustion chamber 110A of each cylinder 110 upon each cycle of the engine 10. In the case of a diesel engine, the amount of air A is determined on the basis of the amount of fuel to be injected. In other words, the diesel engine 10 is controlled on the basis of the amount of fuel C to be injected.

However, over the life of the engine 10, the amount of fuel actually injected may differ from the amount of fuel to be injected that is determined by the electronic control unit 20 due to physical phenomena. Such physical phenomena are for example the propagation of waves in the fuel C that is present in the distribution rail 32, wear to the injectors 33, etc.

Thus, laws for controlling the injectors 33 are used so as to compensate these physical phenomena and thus allow the amount of fuel C actually injected to correspond to the amount to be injected. Each of these control laws measures at least one operating parameter P of an injector 33 so as to determine a possible drift thereof with respect to an optimum value corresponding to optimum operation of the injector 33. The control laws then make it possible to compensate this drift, so as to ensure optimum operation of the injector 33 over the life of the vehicle 1.

A first control law makes it possible to control the electric control power of the piezoelectric injector 33. The operating parameter P measured by the first control law is the drift of the electric control voltage of the injector 33. The first control law is said to be self-adjusting; in other words, over the life of the engine 10, it automatically compensates the electric control voltage so as to ensure optimum operation of the injector 33.

A second control law makes it possible to test each injector 33 at the output of the manufacturing chain of said injector 33. The second control law measures the flow of fuel C supplied by the injector 33 for a determined number, preferably four, of fuel supply pressures for the injector 33. Thus, for each supply pressure, the second control law measures an operating parameter P of the injector 33, which is the flow. The second control law thus allows the electronic control unit 20 to calibrate each injector 33.

A third control law makes it possible to compensate the mechanical and/or hydraulic drift of the injector 33. Such drift may be caused by wear to the injector 33. The third control law compares, during test phases over the life of the engine 10, the amount of fuel actually injected and compares it to the amount of fuel to be injected so as to determine the mechanical wear to the injector 33 and thus compensate the control of the injector 33. The third control law measures this difference for a determined number, preferably between 2 and 16, preferably of the order of 4, of operating points of the injector corresponding to a given flow and pressure. The operating parameter P measured by the third law is the adjustment of the injection time, allowing the injector 33 to inject the determined amount of fuel for each operating point.

A fourth control law makes it possible to guarantee play between the opening element of the injector 33 and its actuator, so as to guarantee leaktightness of the injector 33 when the latter is not injecting fuel C. The fourth control law measures the injection time, making it possible to guarantee both leaktightness of the injector 33 by compensating for the play and the injection of the determined amount of fuel.

Four control laws have been presented, but it goes without saying that a different number of control laws and different control laws could be used, in particular the control law for balancing the cylinders, also called cylinder balancing. Likewise, the operating parameters measured by the control laws could be different.

The method according to an aspect of the invention for diagnosing the engine 10 on the basis of the measured value of the operating parameters will now be presented.

To diagnose the engine 10, a method for diagnosing each injector 33 using the operating parameters of said injector 33 is implemented first of all in a step E10.

Figure 2:
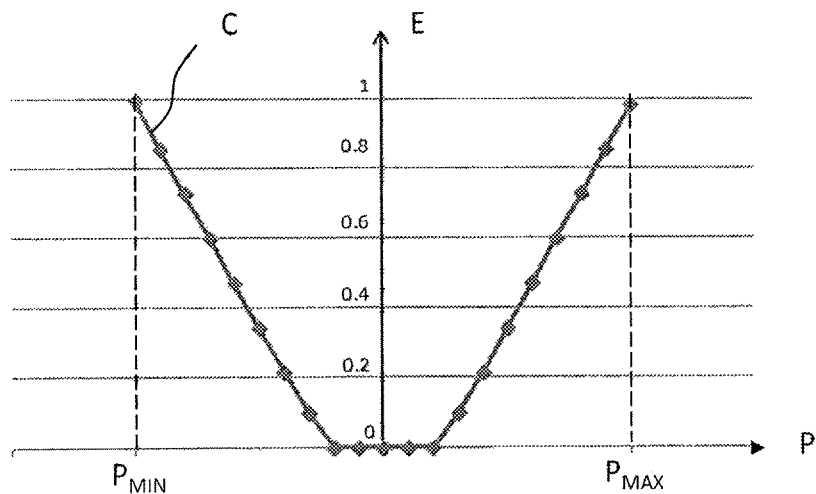
FIG. 2 schematically shows an efficiency curve of an operating parameter of the thermal combustion engine of a vehicle.
Figure 3:
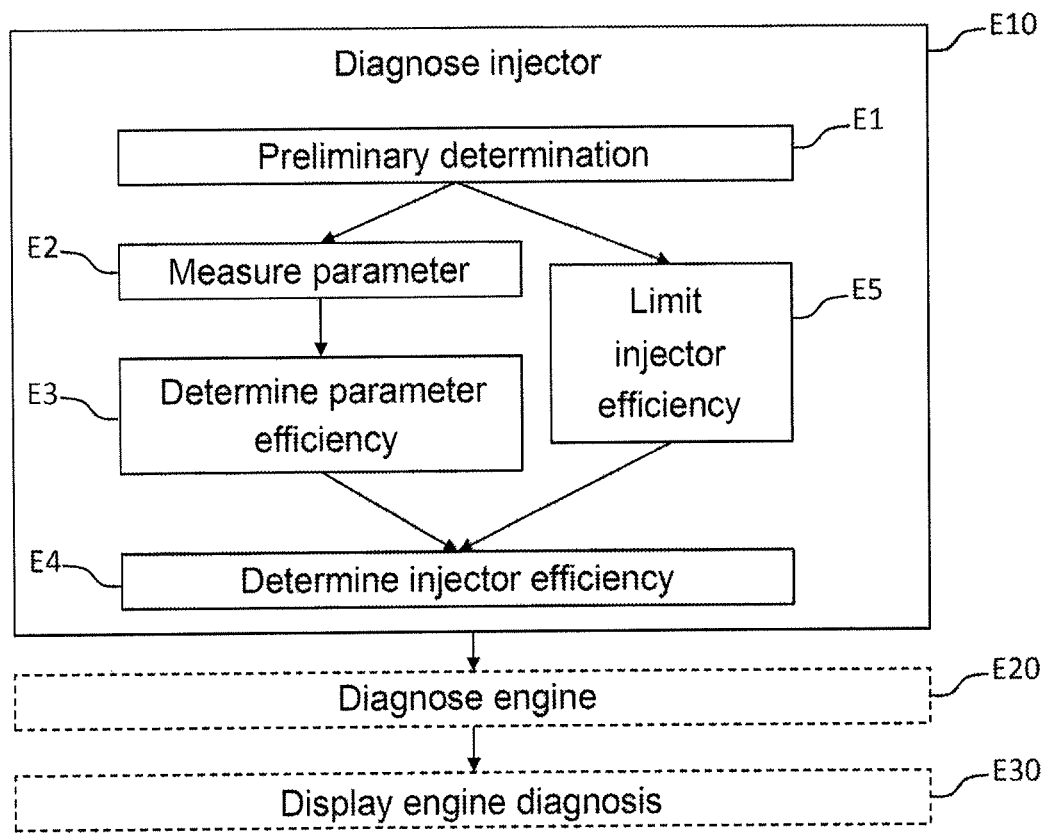
FIG. 3 illustrates one embodiment of the method according to an aspect of the invention for diagnosing the operation of the thermal combustion engine of a vehicle.

For each operating parameter P of the injector 33 measured by the various control laws, an efficiency curve C, as illustrated in FIG. 2, of said parameter P is determined in a preliminary step E1 as illustrated in FIG. 3, for example in the laboratory. To achieve this, a parameter P is tested over the entire operating range thereof, between a minimum value $P_{MIN}$ and a maximum value $P_{MAX}$ of the operating parameter P (with reference to FIG. 2).

To this end, injectors 33 having various levels of wear are tested, each one having a different value of the parameter P. The performance level of each injector 33 is measured so as to associate a performance level of the injector 33 with each value of the parameter P. The value of the parameter P that makes it possible to ensure optimum operation of the injector corresponds to the optimum value of the parameter P. The efficiency of the parameter P whose value is the optimum value is the maximum one, for example equal to 1. The minimum efficiency, for example equal to 0, of the parameter P is generally achieved for the maximum value $P_{MAX}$ and/or the minimum value $P_{MIN}$ of the parameter P. A scale of efficiency of the value of the parameter P is thus determined, graduated between 0 and 1. In other words, the efficiency level of the value of the parameter P represents an efficiency percentage with respect to the optimum value of said parameter P.

The efficiency level E of the parameter is thus determined for each value contained within the operating range, so as to form the efficiency curve C of the parameter P empirically. The efficiency curve C of the parameter P makes it possible to know, for each measured value of the parameter P, its efficiency level E. The efficiency curve C is representative of the wear state of the injector 33, and thus makes it possible to determine whether the injector 33 is operating normally or if it needs to be replaced. It is thus possible to define the performance level of the injector 33 according to the efficiency level achieved: for example, a total performance of the injector 33 for an efficiency between a first threshold, preferably of the order of 0.7, and 1, a reduced performance for an efficiency between a second threshold, preferably of the order of 0.5, and the first threshold, an impaired performance for an efficiency between a third threshold, preferably of the order of 0.3, and the second threshold, and a performance problem for the injector for an efficiency lower than the third threshold.

In a step E2, over the life of the vehicle 1, the operating parameter P of the injector 33 is measured by the control law of said parameter P.

Next, in a step E3, the efficiency E of the operating parameter P is determined using the efficiency curve C of the parameter P and the measured value of the parameter P. The efficiency of each control law may also be determined on the basis of the efficiency of the parameters P of said control law, in particular on the basis of their average, which is preferably weighted.

The efficiency E of the various operating parameters of the injector 33 makes it possible, in a step E4, to determine the efficiency of the injector 33. The efficiency of the injector 33 may be calculated on the basis of the average of the efficiency of the various parameters P. The average of the efficiency of the parameters P may be weighted by the most representative parameters P in order to diagnose the operation of the injector 33. For example, the parameters measured by the first law may have a weight of 1, the parameters measured by the second law a weight of 2, the parameters measured by the third law a weight of 3 and the parameters measured by the fourth law a weight of 4. The value of the efficiency of the injector 33, for example between 0 and 1, is thus obtained.

Lastly, the efficiency of the engine 10 is determined, in a step E20, on the basis of the efficiency of each injector 33 of the engine 10, for example on the basis of the average of the efficiency of the various injectors 33. The value of the efficiency of the engine 10, for example between 0 and 1, is then obtained. The efficiency value of the engine 10 and/or of each injector 33 of the engine 10 may then be displayed, in a step E30, so as to inform the driver and/or a garage operator of the operating state of the engine 10, and thus facilitate maintenance thereof and avoid needless replacement of an injector 33. The efficiency value may be displayed on a screen of the vehicle 1 or else on a suitable device for allowing the vehicle 1 to be controlled, in particular by being linked to the electronic control unit 20.

The implementation of the method according to an aspect of the invention by the electronic control unit 20 has been presented, but it goes without saying that the method could be implemented by any other suitable device, in particular a diagnostic tool external to the vehicle able to be used for example in a garage.

As the control laws are able to measure the parameters P only in precise conditions (for example temperature of the engine, altitude, speed of the vehicle 1, etc.), it is possible for at least one law for controlling the injector 33 not to be launched, and therefore for at least one of the operating parameters P not to have been measured. It is then not possible to determine the efficiency of this parameter P. Thus, in a step E5, there is provision to limit the efficiency of the injector to a predetermined threshold, preferably of the order of 0.5, if at least one of the operating parameters P has not been measured by a control law.

By virtue of the method according to an aspect of the invention, it is possible to determine the efficiency level of the injectors 33 and of the engine 10, and not simply whether or not they are operational. The state of the engine 10 and of the injectors 33 may thus be graduated so as to follow their wear level with greater accuracy.

When the vehicle 1 is checked, for example at a garage, an operator is able to access the efficiency value of the engine 10 and/or of each injector 33 so as to determine whether or not the engine 1 or at least one of the injectors 33 should be replaced. Thus, replacing an injector 33 whose performance level is high enough is avoided, thereby making it possible to limit the maintenance costs of the vehicle 1. According to one aspect of the invention, the efficiency level of the engine 10 may be accessible to the driver, so as to warn him of wear to the engine 10 prior to malfunctioning of the engine 10. The driver may thus take the vehicle 1 to the garage as a preventive measure, thereby making it possible to prevent a breakdown of the vehicle 1.

The invention claimed is:

1. A method for diagnosing the operation of at least one injector of a diesel engine of a motor vehicle, said injector being controlled by at least one control law on the basis of at least one operating parameter of the injector, the method comprising measuring a value of said operating parameter during use of said injector, and determining an efficiency value of the injector on the basis of the measured value of the parameter and of a predetermined reference curve representing the efficiency of the parameter in its interval of operating values, the injector being controlled by a plurality of control laws on the basis of at least one operating parameter of the injector, the at least one operating parameter of the injector being different for each of the control laws, determining an efficiency value of each control law on the basis of the measured value of said at least one parameter of the respective control law and of a predetermined reference curve representing the efficiency of said parameter in its interval of operating values, and wherein the efficiency value of the injector is determined on the basis of the efficiency value of each of the control laws.

2. A method for diagnosing the operation of at least one injector of a diesel engine of a motor vehicle, said injector being controlled by at least one control law on the basis of at least one operating parameter of the injector, the method comprising:

measuring a value of said operating parameter during use of said injector, and determining an efficiency value of the injector on the basis of the measured value of the parameter and of a predetermined reference curve representing the efficiency of the parameter in its interval of operating values, the injector being controlled by a plurality of control laws on the basis of at least one operating parameter of the injector for each of the control laws, determining an efficiency value of each control law on the basis of the measured value of said at least one parameter and of a predetermined reference curve representing the efficiency of said parameter in its interval of operating values, and wherein the efficiency value of the injector is determined on the basis of the efficiency value of each of the control laws, wherein the determination of the efficiency value of the injector is calculated on the basis of the average of the efficiency of the various parameters, the average of the efficiency of the parameters being weighted by the most representative parameters in order to diagnose the operation of the injector.

3. The method as claimed in claim 1, comprising a preliminary step of determining the reference curve.

4. The method as claimed in claim 3, wherein the reference curve is determined empirically.

5. The method as claimed in claim 1, wherein the different operating parameters of the injector for each of the control laws are chosen from among: the drift in the electric supply voltage to the injector, the flow of fuel supplied by the injector at a predetermined operating point of the injector and the drift of the fuel injection time of the injector.

6. The method as claimed in claim 1, wherein, with the injector being controlled by the control law on the basis of a plurality of operating parameters of the injector, the measurement is performed for each of said operating parameters during use of the injector, and the efficiency value of the injector is determined for each parameter on the basis of the measured value of said parameter and of a predetermined reference curve representing the efficiency of said parameter in its interval of operating values.

7. A method for diagnosing the operation of at least one injector of a diesel engine of a motor vehicle, said injector being controlled by at least one control law on the basis of at least one operating parameter of the injector, the method comprising:
measuring a value of said operating parameter during use of said injector, and
determining an efficiency value of the injector on the basis of the measured value of the parameter and of a predetermined reference curve representing the efficiency of the parameter in its interval of operating values,
the injector being controlled by a plurality of control laws on the basis of at least one operating parameter of the injector for each of the control laws,
determining an efficiency value of each control law on the basis of the measured value of said at least one parameter and of a predetermined reference curve representing the efficiency of said parameter in its interval of operating values, and wherein the efficiency value of the injector is determined on the basis of the efficiency value of each of the control laws, and
limiting the determined efficiency value of the injector if at least one of the parameters has not been measured.

8. A method for diagnosing the operation of a diesel engine of a motor vehicle, the engine comprising a plurality of injectors, the method comprising:
for each injector, implementing the method, as claimed in claim 1, for diagnosing the operation of an injector, and
diagnosing the operation of the engine on the basis of the efficiency of the operation of each of the injectors of the engine.

9. The method as claimed in claim 8, further comprising displaying the efficiency value of the operation of the engine, wherein said efficiency value of the operation of the engine is determined on the basis of the efficiency value of the operation of each of the injectors.

10. A motor vehicle comprising a diesel engine comprising at least one injector and an electronic control unit for said engine, said electronic control unit being designed to implement the method for diagnosing the injector as claimed in claim 1.

11. The method as claimed in claim 2, comprising a preliminary step of determining the reference curve.

12. A motor vehicle comprising a diesel engine comprising at least one injector and an electronic control unit for said engine, said electronic control unit being designed to implement the method as claimed in claim 8.

* * * * *